Figure 1:
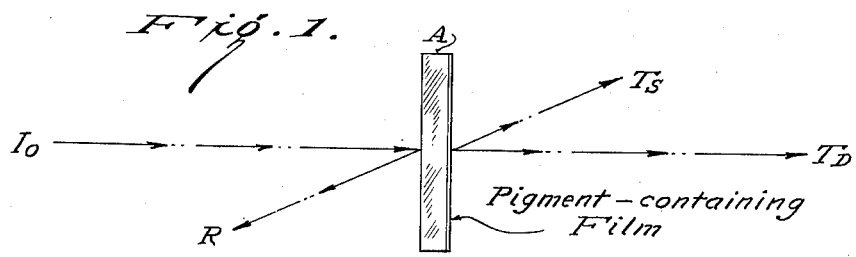

June 26, 1951  G. C. MARCOT ET AL  2,558,302

POWDERED TRANSPARENT IRON OXIDE PIGMENTS

Filed Aug. 7, 1947

$$\text{WHERE: } I_O = A + R + T_S + T_D$$
$$T_T \text{ (Visual total transmission)} = T_S + T_D$$
$$\text{Transparency} = \frac{T_D}{T_S + T_D} \text{ or } \frac{T_D}{T_T}.$$

INVENTORS
GUY C. MARCOT,
WINFRED J. CAUWENBERG,
STEPHEN A. LAMANNA,
BY Wm. P. Spielman
ATTORNEY Patented June 26, 1951

2,558,302

UNITED STATES PATENT OFFICE 2,558,302

POWDERED TRANSPARENT IRON OXIDE PIGMENTS

Guy C. Marcot, Lynchburg, Winfred J. Cauwenberg, Piney River, and Stephen A. Lamanna, Amherst, Va., assignors to American Cyanamid Company, New York, N. Y., a corporation of Maine Application August 7, 1947, Serial No. 767,068

6 Claims. (Cl. 106—304)

This invention relates to iron oxide pigments and is directed particularly to the provision of transparent iron oxide pigments which can be packaged in powdered form without loss of transparency in the finished coatings for which they are intended.

Within recent years a demand has arisen for finishes, such as lacquer coatings for automobile bodies, in which the durability and resistance to fading of iron oxide pigments is combined with the transparency of organic dyes. Such coatings, which are known as transparent finishes, have been produced by flushing procedures in which a water suspension or pulp of iron oxide pigment of extremely fine particle size is kneaded with a large quantity of a water-immiscible drying oil, alkyd resin, nitrocellulose lacquer or other vehicle until all the water is expelled. Typical processes of this kind are described in U. S. Patents Nos. 2,335,760 and 2,384,579.

Up to the present these flushing processes have been the only available methods of obtaining transparent finishes containing iron oxide pigments. Dry powdered iron oxide pigments of the type heretofore known could not be used because they have an average particle size in excess of 0.1 micron, which is too large for good transparency. This is true even of freshly prepared pigment slurries having an average particle size well below 0.1 micron diameter, such as those obtained by precipitating ferric salt solutions, because the pigment particles cluster together or agglomerate upon drying. Because the necessary fine particle size is only obtained in the original slurries or pulps of iron oxide pigments, the utility of the flushing procedures outlined above is limited to the point of manufacture of the iron oxide pigment.

Iron oxide pigments having the extremely fine particle size necessary for transparency would be very desirable in the form of dry powders capable of being shipped in this form to the point of manufacture of the finished lacquer or varnish coating. However, as is noted above, this has been regarded as impossible. Whenever a pulp of iron oxide pigments having a particle size less than 0.1 micron was dried there were formed aggregates having an average diameter well above 0.1 micron, and usually on the order of 0.5 micron or larger, which could not be broken down to produce the fine particle size necessary for transparency by the grinding procedures now used in the preparation of paints and lacquers.

Our present invention is directed to the problem of providing iron oxide pigments in the form of powders having an average particle size well below 0.1 micron diameter, which pigments are substantially free from aggregation. A chemical and microscopical study of pigment pulps having an average particle size below 0.1 micron, produced by previously known processes, has shown that the iron oxide is amorphous in character. We believe that this is one of the principal reasons why these particles adhere to each other so strongly when the aqueous pulps are dried. Accordingly, one of our principal objects was to obtain iron oxide pigment slurries having the requisite fine particle size in which the iron oxide would not be amorphous.

We finally succeeded, by methods which will hereinafter be fully described, in obtaining slurries of iron oxide pigments having an average diameter of less than 0.1 micron which were crystalline in character. These slurries could be dried by ordinary low-temperature drying procedures with much less agglomeration of the particles than had been encountered with amorphous pigments. Further study of the problem then led us to the discovery that the presence of substantial quantities of anion, such as the sulfate or chloride ion, chemically combined in the iron oxide pigments was another important cause of aggregation. By producing iron oxides of definite crystal structure which contain less than 1% and preferably less than 0.5% of combined anion we finally succeeded in producing pigments of the requisite particle size for transparency which could be reduced to substantially dry powders without agglomeration.

From the foregoing it will be seen that a principal object of the present invention is the provision of a class of iron oxide pigments having an average particle size less than 0.1 micron diameter, which is the size necessary for transparency, which pigments are in the form of substantially dry powders characterized by freedom from agglomeration. A further and closely related object is the provision of finely divided, powdered iron oxide pigments in which the individual pigment particles are crystalline in character. Another closely related object is the provision of such pigments which contain less than 1%, and preferably less than 0.5% of combined anion, since the presence of larger quantities than these of anionic impurities is an important contributing factor to aggregation. A still further object, which will hereinafter be more fully explained, is the provision of finely divided, substantially dry iron oxide pigments in which the individual particles are protected against agglomeration, even under the most adverse storage conditions, by a substantially monomolecular layer or film of a hydrophobic or lyophilic organic coating agent. Finally, an additional important and ultimate object is the provision of a class of transparent iron oxide pigments having greatly reduced light-scattering properties, as compared with those previously known, when incorporated into films on the order of 0.005 inch in thickness.

Methods of preparation

In order to obtain very finely divided iron oxide pigments in crystalline form, and particularly the light yellow, golden yellow and brownish orange pigments that are of greatest commercial importance, we find that the pigments must be produced in an alkaline environment. This is true both in manufacturing processes starting with water-soluble ferrous salts such as ferrous sulfate or ferrous chloride, and in those processes in which a water solution of a ferric salt such as ferric chloride is precipitated. It is a well-known fact that the iron hydroxides, or hydrated iron oxides, can be precipitated from iron salt solutions under fairly strongly acid conditions, and pH values on the order of 3.5 to 5 are ordinarily used. Acidic conditions were used in prior art methods of preparation because it was well-known that dark ferri-ferro compounds were formed at higher pH values, including those up to and even exceeding complete neutrality, which compounds would interfere with the clean-colored shade desired in a hydrated iron oxide pigment.

While acid, neutral and slightly alkaline conditions are to be avoided when finally divided, light-colored pigments of clean shade are desired, we have found that these pigments can be obtained by operating under relatively strongly alkaline conditions. Moreover, when these alkaline conditions are used, we have found that the resulting iron oxide pigment particles are definitely crystalline in character, and therefore have greatly reduced agglomerating tendencies upon drying. Formation of the pigments in an alkaline environment also reduces the content of combined anion such as sulfate or chloride in the pigment, for the excess alkali ensures complete precipitation of the hydrated iron oxide, thereby reducing to a minimum the quantity of basic sulfate or chloride formed in the precipitate. In order to ensure an alkaline environment at all times the iron salt solutions should be added to the alkali instead of pouring the alkali into the iron salt solutions.

Another important aid in obtaining finely divided iron oxide pigments which are crystalline in character is the employment of a crystal growth director. We have found that compounds capable of forming complexes with hydrated iron oxide, when present during the pigment manufacture in quantities of from about 0.1% to about 3-5%, will aid materially in producing pigments which are definitely crystalline in character. Moreover, quantities of such a crystal growth director in excess of about 0.5%, based on the weight of $Fe_2O_3 \cdot H_2O$ in the reaction mixture, appear to control the crystalline form of the pigment in such a manner that it possesses greatly reduced light-scattering properties, as compared with amorphous iron oxide pigments of comparable fine particle size of less than 0.1 micron average diameter. The most highly active crystal growth directors are $SiO_2$, when added in the form of an alkali metal or other water-soluble silicate, organic hydroxy carboxylic acids and particularly tartaric acid, citric acid, malic acid and the like, and polyhydroxy phenolic compounds such as tannic acid. However, other compounds possessing the property of forming complexes with hydrated $Fe_2O_3$ may be used.

Although finely divided iron oxide pigments which are definitely crystalline in character and substantially free from combined anion can be dried from aqueous pulps to substantially dry powders containing from about 2% to about 6-7% adsorbed moisture without substantial agglomeration, we have found that it is important to coat the pigment particles with a water-insoluble coating material. Such a coating provides protection against lumping or agglomeration if the dry pigments are stored under adverse conditions, as for example in a warm, moist atmosphere. Moreover, we have found that finely divided crystalline iron oxide pigments coated with a substantially monomolecular layer or film of a lyophilic organic coating material possess reduced light-scattering properties, so that films containing them possess a greatly increased degree of transparency. Because of their greatly increased stability on storage, their greater ease of dispersion in paint, varnish and lacquer vehicles and the increased transparency of the films obtainable thereby we regard these coated iron oxide pigments as an important feature of our invention.

The coating materials which we have found to be most suitable for iron oxide pigments are the water-insoluble organic carboxylic acids containing from about 10 to about 22 carbon atoms and esters of relatively high acid number containing these fatty acids, including particularly fatty acid-modified alkyd resins and ester gums in which abietic acid is esterified with a polyhydric alcohol. Suitable acids of this class are coconut oil fatty acids, oleic acid, ricinoleic acid, talloil fatty acids, abietic acid, naphthenic acid, lauric acid, myristic acid, various fish oil acids including those containing 22 carbon atoms, and similar materials.

In order to obtain a substantially monomolecular layer or film of coating agent on the surfaces of the pigment it is necessary that the coating agent be applied from a substantially molecular dispersion; i. e., from a true solution or a condition approximating solution. All of the above compounds, by reason of their relatively high acid numbers, are capable of being dissolved or dispersed in aqueous alkaline solutions to a state approximating molecular dispersion, and are preferably applied to the iron oxide pigment particles in this condition, but are insoluble in acids. After coating with the alkali metal, ammonium or other salts or soaps, the pigments are therefore treated with an acid to precipitate or insolubilize the adherent coating agent. This coating treatment may advantageously be applied to the pigments while they are still in the alkaline environment wherein they are produced, thus utilizing a portion of the excess alkali to form a soap with the coating agent. Upon acidifying the resulting slurries, washing with water until substantially free from water-soluble salts, and drying at temperatures not exceeding about 140° C. dry pigments having a substantially monomolecular layer of coating agent are obtained.

The amounts of our preferred coating materials to be employed in order to obtain a substantially monomolecular layer or film of the coating agent on the surfaces of the pigment are within the range of from about 10% to about 100% based on the weight of the pigment. It will be evident that the amounts required are dependent on the specific surface area of the pigment and on the nature of the particular coating agent employed. It has been determined, for example, that about 30% by weight of a ricinoleic acid coating will afford a substantially monomolecular film on the particles of an iron oxide pigment which has a specific surface area of about 150 square meters per gram. On filtering, washing and drying such a coated pigment to a final moisture content of about 3-5%, the pigment exhibits no aggregates under a microscope at about 500 magnifications and the dried powder does not lump or agglomerate upon storage in a warm, moist atmosphere. In most instances, however, it is necessary to determine the specific surface area of the pigment to be treated with our preferred coating agents inasmuch as the use of amounts of coating agent appreciably in excess of that necessary to provide a substantially monomolecular film on the pigment will result in a product which is greasy and sticky and consequently difficult to filter and grind.

In addition to coating the finely divided iron oxide pigments, another factor that contributes materially to storage stability is freedom from more than 1% of adsorbed or admixed water-soluble or hygroscopic salts of the type of sodium or potassium chloride or sulfate. We also find that the finely divided iron oxide pigments can be more easily dried by ordinary drying procedures to a moisture content of 5% or less when their content of salts is maintained below 1%, based on the weight of the iron oxide in the pigment. Accordingly the preferred iron oxide pigments of our invention are those which, in addition to the characterizing features outlined above, are free from substantial quantities of inorganic salts and other hygroscopic materials.

*Manufacturing processes*

The iron oxide pigments of the present invention can be manufactured from water-soluble ferrous salts such as ferrous chloride, ferrous sulfate and the like, or from the corresponding ferric salts such as ferric chloride or ferric sulfate. When ferrous salts are employed, an aqueous solution thereof is reacted with an excess of a strong alkali such as an alkali metal hydroxide or an alkaline earth metal hydroxide, using at least 130% of the stoichiometrical equivalent of the ferrous iron (i. e., 2 moles of NaOH or 1 mole of $Ca(OH)_2$) followed by oxidation of the ferrous iron to the ferric condition, preferably by aeration, under controlled time and temperature conditions. When a crystal growth director such as sodium silicate, tartaric acid and the like is used in amounts of at least 0.1%, based on the $Fe_2O_3.H_2O$ content, the minimum quantity of alkali can be reduced to about 115% of the stoichiometrical equivalent. The upper limit of the quantity of alkali is governed only by economical considerations, although further improvements are not ordinarily obtained when more than about 400% of the stoichiometrical equivalent is employed. The precipitation and oxidation should be carried out at a temperature below about 40° C. and the oxidation should be completed within a period of about 10 hours in order to ensure the production of an iron oxide pigment having an average particle size less than 0.1 micron diameter. Ferrous salt solutions or slurries having a concentration of from about 5 grams to about 60 grams per liter of solution, calculated as $Fe_2O_3.H_2O$, should be used, and preferably within the range of from about 5 to about 30 grams per liter of solution. The above method of producing finely divided iron oxide pigments is not claimed in the present application, since it forms the subject matter of our copending application Serial No. 767,069 filed concurrently herewith and later substituted by a continuation-in-part Serial No. 14,274 filed March 11, 1948.

Similar results are obtained when an alkali metal carbonate is employed instead of a hydroxide of an alkali-forming metal, although in this case the quantity of alkali metal carbonate can be reduced to approximately the stoichiometrical equivalent of the ferrous iron. From this ratio the effective quantity ranges to 200% of the stoichiometrical equivalent as a practical upper limit, although of course larger quantities may be employed. The temperature conditions during precipitation and oxidation and the rate of oxidation, as well as the preferred concentration of ferrous salt solution, are substantially the same as when free alkalis are employed. This method, employing alkali metal carbonates as the alkaline precipitating agent, is described and claimed in our copending application Serial No. 767,070 filed concurrently herewith.

When water-soluble ferric salts such as ferric chloride are employed no oxidation is necessary. A ferric salt solution is added to a water solution of an alkali such as a hydroxide of an alkali-forming metal or a carbonate of an alkali metal in such concentration that the precipitate formed has a concentration of from about 5 grams to about 60 grams per liter calculated as $Fe_2O_3.H_2O$, and the resulting precipitate is digested to produce a pigment having an average particle size less than 0.1 micron diameter and preferably less than 0.05 micron diameter. At least a stoichiometrical equivalent of alkali should be used in order to ensure freedom from substantial quantities of combined anion in the finished iron oxide pigment; however, it will be noted that this equivalency is based on trivalent iron instead of on divalent iron as in the case of ferrous salts. In other words, at least 3 moles of an alkali metal hydroxide such as sodium hydroxide or 1.5 moles of an alkaline earth metal hydroxide or of an alkali metal carbonate should be used for each mole of ferric chloride. Quantities of alkali up to 200%, or greater, of the stoichiometrical equivalent may of course be used if desired, the upper limit depending only on economic considerations.

The reaction between the ferric salt solution and the alkali solution should be carried out relatively slowly, in order to avoid localized acidification. Preferably, the aqueous ferric salt solution is added to the aqueous solution of alkali in one or several thin streams while the alkali is agitated vigorously; best results are obtained when the mixing is carried out over a period of from 15-30 minutes or longer. The resulting mixture is then preferably digested for an additional period of time ranging from about 15 minutes to 1 hour or longer in order to develop the desired shade and particle size in the finished iron oxide pigment. We have found that the temperature of the reaction mixture during the addition of the ferric salt solution and subsequent digestion is quite important; temperatures above 40° C. are preferably employed to obtain pigments having particle size such that they may be readily filtered and more easily handled. Thus, for example, finely divided iron oxide pigments having a golden yellow color are obtainable at reaction temperatures of 45–50° C., when employing alkali metal hydroxides, whereas pigments having a clean, light orange color tone may be obtained at reaction temperatures of 75–95° C. when employing alkali metal carbonates.

The fineness of particle size of the finished pigment is a function of the rate of addition of the ferric salt solution, the rate of agitation, and the composite concentration, and is also influenced by temperature conditions. The formation of a crystalline iron oxide pigment having a particle size less than 0.1 micron is also facilitated by the presence of a crystal growth director during the reaction in amounts of at least 0.1%, based on the $Fe_2O_3.H_2O$ content of the finished pigment, and preferably in amounts of 0.5% to 4–5%. The best crystal growth directors are $SiO_2$, added in the form of an alkali metal silicate, and hydroxy carboxylic acids such as tartaric acid. These crystal growth directors are preferably dissolved in the aqueous solution of alkali-forming metal hydroxide or alkali metal carbonate prior to the addition of the ferric salt solution thereto.

Transparency or visibility

Figure 2:
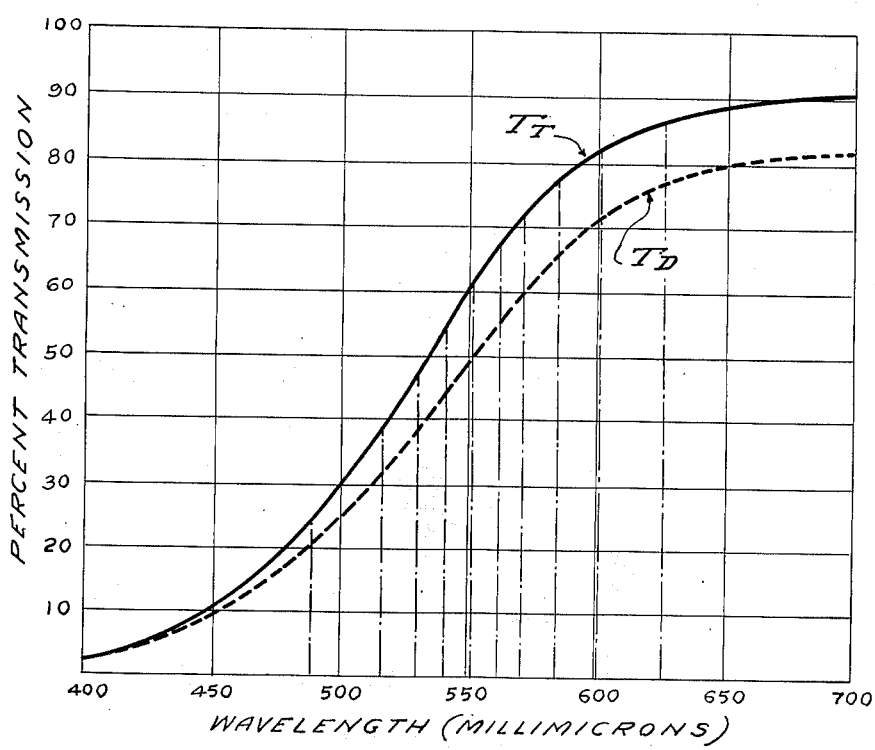

To more clearly define the term "transparent," as it is used in the present specification, reference will be had to the accompanying drawings. Fig. 1 is a diagrammatic representation of the transmission of a beam of light through a piece of plate glass coated with a film containing a partially transparent pigment, and Fig. 2 is a visual range transmission curve indicating the amount of light transmitted by a film containing a transparent iron oxide pigment at the various wave lengths of the visual spectrum.

In Fig. 1 it will be observed that part of the light striking the glass is reflected as shown by R. Another portion of the light, absorbed by the glass and film, is represented by A. The light which is transmitted emerges partially undeviated and partially scattered as represented in the drawing by $T_D$ and $T_S$ respectively. The total light transmitted ($T_T$) is the sum of $T_D$ and $T_S$. In defining visibility, only light which is transmitted is of importance and, therefore, that portion of the incident light which is reflected and/or absorbed may be disregarded. Therefore, the formula $$\frac{T_D}{T_T}$$

represents the visibility or non-light-scattering value of any pigment-containing film capable of transmitting light.

In measuring the amount of light which is transmitted by a film containing our novel iron oxide pigment, a beam of light is passed through a sheet of clear plate glass which has been coated with a film containing a small amount of the pigment and the total transmitted light and the direct transmitted light is measured spectrophotometrically over the entire visual spectrum (400–700 m$\mu$).

The data are obtained in the form of a graph such as that of Fig. 2 of the drawings. We have found it most convenient, in calculating the visibility of the radiant energy represented by the curves of Fig. 2, to employ those selected ordinates set forth on page 51 of the "Handbook of Colorimetry," by Arthur C. Hardy, 1936. These are 489.4, 515.1, 529.8, 541.4, 551.7, 561.8, 572.5, 584.8, 600.7 and 627.1 millimicrons.

It will be understood by those skilled in the art that these selected ordinates have been so chosen as to give visibility values which are those that the standard observer would see when the samples are irradiated by light having the spectral quality of illuminant C, the characteristics of the standard observer and illuminant C having been established by the International Commission on Illumination. In computing the transparency or visibility values, the sum of the values of $T_D$ for these selected ordinates is divided by the sum of the values of $T_T$, as shown for example in Fig. 2.

It will be apparent that those pigmented films which present the highest figures are those which transmit undeviated the greater portion of light. These films are therefore more truly non-light-scattering than those having relatively smaller $$\frac{T_D}{T_T}$$

values. It has been found that only those pigments which afford pigmented films having visibility or non-light-scattering values of 75 or more may be regarded as being highly transparent. Those pigments giving lower values, while capable of producing films which transmit sufficient light so as to render them adequate for certain purposes produce films which still present a somewhat murky appearance, indicating that the individual particles are too large, or that some aggregation of the pigment particles has occurred.

The method we have employed to determine the degree of transparency of our novel iron oxide pigments has been chosen because of the facility with which such measurements may be made and because the standard films containing our pigments are comparable to those employed by industry and thus present a valuable and accurate index of the practical merits of each of the pigments. It will be seen from the formula by which the values of our novel iron oxide pigments are obtained that transparency or visibility is a function of light-scattering of the pigment. Thus, for pigments possessing high transparency values, the thickness of the pigmented coating films is of no consequence. However, when the visibility or non-light-scattering value of the pigmented film is relatively low, the thickness of the film becomes quite important. For this reason the standard film described herein, and employed in the examples, is ordinarily one having a wet thickness of 0.005 inch. However, we have also demonstrated that the pigment concentration in the coating films may be varied within wide limits. Samples of the various dried finished pigments were ground in a volatile organic solvent such as toluene, xylene, benzene, and the like solvents, and the pastes produced were spread out on sheets of clear plate glass. When the solvent had evaporated, the films obtained consisted of about 70% pigment and about 30% of finishing materials which have been hereinbefore fully described. The transparency or visibility values of these concentrated pigment films were consistently greater than 85, thus indicating that our novel iron oxide pigments are finely dispersed and substantially free of aggregates in the coating films prepared therewith.

As hereinbefore stated, one of the factors contributing to accurate regulation of the crystal growth habits of iron oxide is the oxidation rate. One of the methods by which the oxidation of ferrous salts in aqueous suspension may be hastened is by means of affording a greater amount of oxygen to the reaction medium. However, where an oxygen-containing gas is to be employed, the rate of addition of oxygen or oxygen-containing gas to the medium is dependent to a large extent on the size of the gaseous bubbles passed through the medium. When the size of these gaseous bubbles becomes too great, the effective use thereof is diminished in that a greater proportion of the oxygen merely passes through the medium and to the atmosphere without effectively coming in contact with the iron compound. It is, therefore, of importance that the size of the bubbles of gaseous material passed through the reaction medium be maintained in as fine condition as possible. To this end it has been found that the addition to the reaction medium of a small amount of a frothing or surface tension reducing agent of the type well-known in froth flotation of minerals, such as sodium ricinoleate, pine oil, etc., is of great advantage in providing minute gaseous bubbles which are thereby enabled to come into relatively intimate contact with the iron present in the solution and thus more rapidly accomplish the oxidation thereof. It is to be understood, however, that the oxidation of iron compounds according to the method of this invention is not limited to the use of gaseous oxygen-containing materials. The oxidation of such compounds may be readily conducted by the employment of chemical oxidants such as hydrogen or sodium peroxide or sodium hypochlorite and the like oxidants.

Although the finely divided crystalline iron oxides of the present invention have been described with particular reference to the production of transparent iron oxide pigments, it will be evident that they are not necessarily limited to this purpose. On the contrary, they may be employed in industry wherever a finely divided, substantially dry iron oxide powder of crystalline form may be required; thus, for example, they may be used as finely divided catalysts in the so-called fluid stream process of carrying out catalytic reactions; for flocculation or coagulation in water treatment, and for a variety of other purposes.

The invention will be further described in greater detail by reference to the following specific examples. It will be understood, however, that although these examples may describe in detail some of the preferred embodiments of the invention, they are given primarily for purposes of illustration and the invention in its broader aspects is not limited thereto.

*Example 1*

One liter of an aqueous solution containing 188 grams of copperas (equivalent to 60 grams of $Fe_2O_3 \cdot H_2O$) was added to 1 liter of an aqueous solution containing 108 grams of NaOH (200% of the stoichiometrical amount) at 25–30° C. The mixture, containing the equivalent of 30 grams per liter of $Fe_2O_3 \cdot H_2O$, was stirred for about 10 minutes, and was thereafter aerated for about 8 hours at 25–30° C. The final slurry was yellow colored.

The yellow slurry was washed with water, filtered, and washed with small amounts of ethyl alcohol and benzol. The pigment was then dried at 50–55° C. Upon analysis it was determined that the individual particles were needle-shaped crystals and that the pigment had a specific surface of approximately 65 square meters per gram. The $SO_3$ content of this material, calculated as $Na_2SO_4$ was 0.2%.

0.5 gram of the dried pigment and 1.5 grams of a mixed plasticizer comprising 1 part of raw castor oil, 1 part of blown castor oil, and 1 part of dibutyl phthalate, were mixed and ground on a Hoover Muller (laboratory grinding machine employing two flush circular ground plates under pressure, one rotor and one stator).

0.5 gram of the paste so obtained was then thinned with 10 grams of a lacquer composite formulated as follows:

240 parts of a nitrocellulose lacquer at 28% non-volatile solids
70 parts of a maleic anhydride modified ester gum at 50% non-volatile solids
15 parts of blown castor oil
15 parts of dibutyl phthalate
20 parts of a non-oxidizing glycerol modified alkyd resin at 60% solids
90 parts of butyl acetate
Composite: volatile—308; non-volatile—142
(In the composite, the pigment concentration was 4.6% by weight of the non-volatile residue.)

A 0.005 inch thick film of the above composite was pulled down on a plate glass for evaluation by both transmitted and reflected light. The film had a transparency value of 77, and possessed a clean yellow color tone.

*Example 2*

810 pounds of commercial caustic soda flakes dissolved to a total volume of 1700 gallons at 25° C. was charged to a steel tank equipped with an agitator, cooling and heating coils, and two aeration tubes containing about 700–800 ⅛-inch holes and connected to an air compressor with a capacity of 200 cubic feet per minute. A quantity of sodium silicate equivalent to 12 pounds of $SiO_2$ was added with the caustic soda. 60 grams of saponified castor oil was added to the aqueous caustic as a frothing agent.

2000 pounds of copperas dissolved to a total volume of 400 gallons at 25° C. and having a pH of 2.2 was added to the aqueous caustic over a period of 15 minutes. The mixture was adjusted with water to a total volume of 2400 gallons, after which it was agitated for 15 minutes.

The mixture was then aerated for 4 hours employing 200 cubic feet per minute of air. The rate of oxidation was determined by permanganate titration with the following results:

| Time, Hours | Extent of Oxidation, Per Cent |
| --- | --- |
| 1 | 40 |
| 2 | 60 |
| 3 | 85 |
| 4 | 100 |

The oxidation was carried out at 25–30° C., the charge being agitated continuously.

To the final slurry was added 210 pounds of castor oil which had been saponified with NaOH. The composite was mixed and diluted with water to 7800 gallons at 25° C. Thereafter the mixture was acidified to pH 6 with 10% $H_2SO_4$ and adjusted to 8850 gallons at 25–30° C., followed by mixing for 1 hour. A floc formed and after settling for 2 hours, 6000 gallons of supernatant liquor was drawn off. The remainder was diluted again and adjusted as above described. This procedure was repeated until the material had been washed 7 times. The final washed precipitate was filtered in a frame press wherein the press cake was washed with 3000 gallons of water, after which the filter cake was dried at 45–50° C. to a moisture content of 5%. The dried material was thereafter ground in a micropulverizer. Analysis of the material showed that the $SO_3$ content calculated as $Na_2SO_4$ was 0.1%.

The pulverized crystalline pigment was then ground with a castor oil modified alkyd resin to form a paste which was thereafter incorporated into an alkyd resin enamel consisting of 80% of a semi-oxidizing soya fatty acid and castor oil-modified phthalic glyceride resin of medium oil length, and 20% of a butylated melamine resin-alkyd resin blend. The final enamel composition contained 1.5% pigment (calculated as $Fe_2O_3 \cdot H_2O$), based on the non-volatile content of the enamel, and 98.5% vehicle.

A dried film of this pigment-containing enamel exhibited a transparency value of 92, and the film had a clean yellow color tone.

Example 3

188 grams of copperas dissolved in water to 1 liter at 25° C. was added to an aqueous mixture comprising 1 liter of water containing 80.9 grams of caustic soda, and sodium silicate equivalent to 1.2 grams of $SiO_2$. The composite was mixed for 5 minutes and then the slurry was aerated at 25° C. for about 5 hours. A sample of the product showed upon analysis a sulfate content of 0.4%, calculated as $Na_2SO_4$. The oxidized slurry was therefore boiled for one-half hour after which the sulfate content was 0.1%.

This pigment was treated with 25 grams of castor oil which had been completely saponified with caustic soda. The composite was mixed, acidified to pH 6 with sulfuric acid and again mixed, inducing a heavy floc of the pigment. The treated slurry was then filtered and washed, the filterability was very good.

A lacquer containing this pigment was prepared. The product as a lacquer film was very low in opacity, had a transparency value of 97, and possessed a clean golden color tone.

When the above example was repeated employing 24 grams of oleic acid, and in another instance 30 grams of naphthenic acid, as the surface coating agent, the final products exhibited very good transparency essentially equal to that of the above surface-coated product. Additional coating agents which have been found to give satisfactory results are tall oil acids, lauric acid, myristic acid, palmitic acid, fish oil acids containing about 22 carbon atoms, and like materials.

Similar results were obtained when 89.3 grams of sodium carbonate were substituted for the caustic soda, the temperature and reaction time remaining the same. A crystalline iron oxide pigment having a sulfate content of 0.05% was obtained which, after coating with 30 grams of ricinoleic acid, had a transparency value of 90.

Example 4

507 pounds of commercial caustic soda flakes dissolved to 2300 gallons at 25° C. was charged to a steel tank equipped with agitators, cooling and heating coils and two aeration tubes containing about 700–800 ⅛-inch holes and connected to an air compressor with a capacity of 200 cubic feet per minute. 7½ pounds of tartaric acid were added to the caustic soda solution.

289 gallons of an aqueous copperas solution containing the equivalent of 156 grams per liter of $Fe_2O_3 \cdot H_2O$ was added to the tank and a composite was diluted to 3000 gallons after which it was agitated for about 5 minutes.

The mixture was then aerated for ¾ hour employing 200 cubic feet per minute of air at a temperature of 25° C. 150 pounds of castor oil, previously saponified with 75 pounds of caustic soda in 250 gallons of water, was added to the mixture. The mixture was then diluted to a total volume of 7800 gallons, acidified to pH 6, and allowed to settle for 2 hours after which 4500 gallons of supernatant liquor was drawn off. The remainder was diluted again until the mixture had been washed 7 times. The final washed precipitate was filtered in a frame press, dried at 50° C., and thereafter ground in a micro-pulverizer. The pigment was found to contain 0.06% $SO_3$.

A dried film of this pigment, incorporated in an enamel in a manner similar to that of Example 2, had a transparency value of 98.

Prior to the addition of the saponified castor oil, a portion of the slurry was withdrawn. Portions of this slurry were treated with various resins, such as diethylene glycol modified castor oil-azelaic acid alkyd resins, non-oxidizing 2-ethylhexoic acid-pentaerythritol alkyd resins, rosin-dibasic acid type resins, terpene-dibasic acid type resins, and the like resins which have been found to be particularly well adapted for affording the most satisfactory redispersion of the pigment in various alkyd and lacquer vehicles.

Ordinarily, these resins are employed as alkali solutions which are obtained by dissolving about 20–30 grams of the desired resin in 1 liter of a 5% aqueous ammonia solution.

In the case of a diethylene glycol modified castor oil-azelaic acid alkyd resin, best results have been obtained when 1 liter of iron oxide slurry containing the equivalent of 15 grams per liter of $Fe_2O_3 \cdot H_2O$ has been treated with 375 ml. of the above-described alkaline resin solution, mixed, acidified to pH 6, and filtered, washed, and dried.

In the case of various of the other above-named resins, 525 ml. of alkaline resin solution was employed.

Lacquer and enamel films prepared from pigment finished with these resins possessed transparency values in excess of 90.

Example 5

188 grams of copperas dissolved to 1 liter at about 30° C. was added to 1 liter of an aqueous solution containing 81 grams of NaOH to which 0.3 gram of tartaric acid had been added. The composite was mixed for 10 minutes at about 30° C., and was then aerated at 30° C. for 1.25 hours.

When the pigment thus obtained was finished and incorporated in an enamel according to the method of Example 2, a dried film thereof had a transparency value of 97, and the film was a lemon yellow color.

Example 6

The procedure of Example 2 was followed, except that 3.3% of zinc in the form of 8.8 grams of $ZnSO_4$ was added to the reaction medium as a crystal growth director.

A dried lacquer film containing 5% of this pigment had a transparency value of 88.

Example 7

The procedure of Example 2 was followed, except that 1% (0.6 gram) of citric acid was added to the reaction medium as a crystal growth director.

A dried lacquer film containing 5% of this pigment had a transparency value of 90, and had a yellow color tone.

Example 8

188 grams of copperas dissolved to 1 liter at 25° C. was added to 89 grams of soda ash which had been dissolved to 1 liter at 25° C. Sufficient sodium silicate equivalent to 1.2 grams $SiO_2$ was then added to the mixture. The composite was maintained at 25° C. over an oxidation cycle of about 8 hours.

The final product was finished as a dry product by surface treatment with ricinoleic acid according to the method of Example 2. When evaluated in a lacquer film, it presented a transparent film having a transparency value of about 95, and possessed a clean yellow color tone. The pigment had an $SO_3$ content of 0.04% calculated as $Na_2SO_4$.

Example 9

188 grams of ferrous sulfate dissolved to 500 ml. in water was added to 125 grams of sodium bicarbonate dissolved in water to 1500 ml., the solutions being maintained at 25–30° C. The ferrous sulfate solution was added slowly, over a period of about 5 minutes so that there was no overflow of $CO_2$ froth. Then the composite was mixed for 10 minutes after which it was aerated for 3½ hours at 25–27° C.

The oxidized slurry was treated with 36 grams of saponified castor oil, acidified to pH 6, filtered, water-washed, and dried at about 50° C. The so-obtained pigment had a sulfate content of 0.04% calculated to $Na_2SO_4$.

When the product was incorporated in a clear lacquer, a dried film thereof had a transparency value of 96 and the film was a clean rich yellow color.

Example 10

To a solution of 74 grams of $Na_2CO_3$ in 1500 ml. of water at a temperature of 75° C. was added a solution containing 90 grams of ferric chloride heptohydrate and 31 grams of $Na_2SO_4$ in 500 ml. of water. The addition was made over a period of 15 minutes and the mixture was thereafter digested for an additional 15 minutes at about 75° C. Thereafter the mixture was cooled to 30° C. and the slurry was treated with 12 grams of saponified castor oil, acidified to pH 6, filtered, water-washed, and dried at about 70° C. The $SO_3$ value of this pigment was 0.3% calculated as $Na_2SO_4$ and the chloride content was less than 0.1% calculated as NaCl.

When incorporated in a lacquer according to the method set forth in Example 1, a dried pigment-containing film having a clean light orange color tone and a transparency value of 96 was obtained.

Example 11

The procedure of Example 10 was repeated except that the addition of the ferric solution to the alkaline solution and the digesting treatment was carried out at a temperature of 95° C. The $SO_3$ content of the pigment was less than 0.1%, and the chloride content was less than 0.1%.

A lacquer containing this pigment presented a dried film having an orange-red color tone and a transparency value of about 87.

Example 12

To a solution containing 162 grams of NaOH in 1500 ml. of water at 45–50° C., and to which had been added 1.2 grams $SiO_2$ (from a sodium silicate solution containing 100 grams per liter of $SiO_2$), was added a solution containing 182 grams of ferric chloride heptahydrate in 500 ml. of water. The addition was carried out over a 15-minute period, and the composite was thereafter digested for about ¾ hour at 45–50° C. Thereafter the slurry was cooled to 30° C., treated with 45 grams of saponified caster oil, acidified to pH 6, filtered, water-washed, and dried. The chloride content of the pigment was less than 0.1%.

A dried lacquer film of this pigment presented a golden yellow color tone and had a transparency value of about 95.

Example 13

615 ml. of an aqueous ferrous chloride solution containing a total iron content equivalent to 40 grams of $Fe_2O_3.H_2O$ was added to 1385 ml. of an aqueous solution containing 72 grams of NaOH at about 25° C. The composite was mixed for 10 minutes and was thereafter aerated for 1 hour at a temperature of about 25° C. The slurry was then treated with sodium ricinoleate in an amount equivalent to 30% of the weight of the precipitated iron oxide, acidified to pH 6, filtered, water-washed, and dried. Analysis of the pigment showed a chloride content of less than 0.1% calculated as NaCl.

The pigment so obtained was incorporated into a clear lacquer and applied as a wet film having a thickness of 0.005 inch. The dried film had a transparency value of 92 and was a clean lemon-yellow in color.

Example 14

The procedure of Example 13 was followed, except that 0.8 gram of tartaric acid was added to the reaction mixture prior to the aeration treatment and the oxidation was completed in ½ hour. The chloride content of the pigment was less than 0.1% calculated as NaCl.

When the so-produced pigment was incorporated in a clear lacquer film, the dried film had a transparency value of 93 and was golden colored.

Example 15

615 ml. of an aqueous ferrous chloride solution containing a total iron content equivalent to 40 grams of $Fe_2O_3.H_2O$ was added to 1385 ml. of an aqueous solution containing 67 grams of commercial hydrated lime at a temperature of about 25° C. The composite was mixed for 10 minutes at which point the slurry had a pH of 12 measured with a glass electrode. The mixture was aerated for 1 hour at a temperature of 25° C. The slurry was then treated with saponified castor oil in an amount equivalent to about 30% by weight of the precipitated iron oxide, acidified with HCl to about pH 6, filtered, water-washed, and dried. The chloride content of the pigment was 0.08% calculated as $CaCl_2$.

The pigment was thereafter incorporated in a clear lacquer and a dried film thereof had a transparency value of 98 and was golden yellow colored.

What we claim is:

1. An iron oxide pigment in the form of a powder containing not more than about 5–7% of free moisture and having an average particle size less than 0.1 micron in maximum diameter, said powder consisting essentially of discrete particles of crystalline ferric oxide containing less than 1% of combined anion, said pigment being characterized by a visibility value $$\frac{T_D}{T_T}$$

of at least 75 for unscattered transmitted light when measured in a film pigmented therewith having a wet thickness of about 0.005 inch where for wave lengths of 400 to 700 millimicrons $T_D$ equals amount of light transmitted undeviated and $T_T$ equals the sum of the amount of light transmitted but scattered and the light transmitted undeviated.

2. A pigment according to claim 1 in which the particles contain less than 0.5% of combined anion.

3. An iron oxide pigment in the form of a powder containing not more than about 5-7% of free moisture and having an average particle size of less than 0.1 micron in maximum diameter, said powder consisting essentially of discrete particles of crystalline ferric oxide containing less than 1% of combined anion protected against agglomeration by a coating of from 10% to about 100% of their weight of a member of the group consisting of organic carboxylic acids of 10-22 carbon atoms and high acid number esters containing these acids, said pigment being characterized by a visibility value $$\frac{T_D}{T_T}$$

of at least 75 for unscattered transmitted light when measured in a film pigmented therewith having a wet thickness of about 0.005 inch, where for wave lengths of 400 to 700 millimicrons $T_D$ equals amount of light transmitted undeviated and $T_T$ equals the sum of the amount of light transmitted but scattered and the light transmitted undeviated.

4. An iron oxide pigment in the form of a powder containing less than 1% of water-soluble inorganic salts and not more than about 5-7% of free water, said powder consisting essentially of discrete particles of crystalline ferric oxide having an average particle size less than 0.1 micron in maximum diameter and containing less than 0.5% of combined anion protected against agglomeration by a coating of from 10% to about 100% of their weight of a member of the group consisting of organic carboxylic acids of 10-22 carbon atoms and high acid number esters containing these acids, said pigment being characterized by a visibility value $$\frac{T_D}{T_T}$$

of at least 85 for unscattered transmitted light when measured in a film pigmented therewith having a wet thickness of about 0.005 inch where for wave lengths of 400 to 700 millimicrons $T_D$ equals amount of light transmitted undeviated and $T_T$ equals the sum of the amount of light transmitted but scattered and the light transmitted undeviated.

5. A method of producing a crystalline iron oxide pigment in the form of a powder having an average particle size less than 0.1 micron in maximum diameter which comprises adding an aqueous solution of a water-soluble ferric salt to an aqueous solution containing a water-soluble alkali in an amount of at least 100% of the stoichiometrical equivalent of said ferric salt maintained at a temperature above 40° C. but not above 95° C., digesting the resulting slurry for at least 15 minutes at a temperature above 40° C. but not above 95° C., washing the resulting finely divided iron oxide with water until its content of water-soluble salt is below 1%, and drying the iron oxide pulp to a free moisture content below about 5-7% by heating it at temperatures below about 140° C.

6. A method according to claim 5 in which the iron oxide slurry after digestion is coated by adding thereto a quantity of a water-soluble soap of a member of the group consisting of water-insoluble organic carboxylic acids of 10-22 carbon atoms and high acid number esters containing these acids, said quantity being within the range of 10% to 100% of the weight of the iron oxide and being such as to cover all of the iron oxide particles in said slurry with a coating of approximately one molecule in thickness, and acidifying the slurry to decompose said soap and deposit said carboxylic acid material on said iron oxide particles in a monomolecular layer.

GUY C. MARCOT.
WINFRED J. CAUWENBERG.
STEPHEN A. LAMANNA.

REFERENCES CITED

The following references are of record in the file of this patent:

UNITED STATES PATENTS

| Number | Name | Date |
| --- | --- | --- |
| 1,540,445 | Wilson | June 2, 1925 |
| 1,832,417 | O'Brien | Nov. 17, 1931 |
| 2,111,727 | Plews | Mar. 28, 1938 |
| 2,335,760 | Hucks | Nov. 30, 1943 |
| 2,357,096 | Fireman | Aug. 29, 1944 |

FOREIGN PATENTS

| Number | Country | Date |
| --- | --- | --- |
| 466,023 | Great Britain | May 18, 1937 |
| 452,734 | Great Britain | Aug. 28, 1936 |
| 313,999 | Great Britain | June 21, 1944 |

OTHER REFERENCES

Mellor: Comp. Treatise on Inorg. Chem., vol. 13, p. 838, 1934, Longmans, Green and Co.

Wood: "Physical Optics," pp. 103 and 104. Pub. by the MacMillan Co., 1936, New York city.

Handbook of Chemistry and Physics, 30th ed., page 2249. Pub. by Chemical Rubber Publishing Co., 1946 copyright, Cleveland, Ohio.

Schoefield: "Iron Oxide Pigments," Paint Manufacturer, June 1947, vol. 17, No. 6, pages 181-184.

Mellor: "Comprehensive Treatise on Inorganic and Theoretical Chemistry," vol. 13, page 784, Longmans, Green and Co., New York (1934).